United States Patent

Toyoda et al.

[11] Patent Number: 5,084,361
[45] Date of Patent: Jan. 28, 1992

[54] HEAT RESISTANT STRUCTURE

[75] Inventors: Tetsuro Toyoda; Katsunori Matsuoka, both of Tokyo, Japan

[73] Assignee: Showa Aircraft Industry Co., Ltd., Tokyo, Japan

[21] Appl. No.: 681,903

[22] Filed: Apr. 8, 1991

[30] Foreign Application Priority Data

Apr. 17, 1990 [JP] Japan .................. 2-101443

[51] Int. Cl.⁵ .................. B32B 3/12; B01J 32/00; B23K 1/00; B23K 101/02
[52] U.S. Cl. .................. 428/593; 428/594; 502/439; 502/527; 228/181
[58] Field of Search .................. 428/593, 594, 603; 502/439, 527; 228/181, 245, 246, 247, 252

[56] References Cited

U.S. PATENT DOCUMENTS

| | | | |
|---|---|---|---|
| 3,057,057 | 10/1962 | Langhans | 228/181 |
| 3,369,288 | 2/1968 | Halnan | 228/181 |
| 4,205,118 | 5/1980 | Schubert | 428/593 |
| 4,381,590 | 5/1983 | Nonnenmann et al. | 228/245 |
| 4,824,011 | 4/1989 | Maus et al. | 228/181 |
| 4,948,774 | 8/1990 | Usui et al. | 502/439 |
| 5,002,923 | 3/1991 | Koshiba et al. | 502/527 |

FOREIGN PATENT DOCUMENTS

| | | | |
|---|---|---|---|
| 59-42173 | 3/1984 | Japan | 228/181 |
| 59-101243 | 6/1984 | Japan | 228/181 |
| 59-101244 | 6/1984 | Japan | 228/181 |
| 63-16858 | 1/1988 | Japan | 228/181 |
| 63-56323 | 3/1988 | Japan | 228/181 |
| 64-48671 | 2/1989 | Japan | 228/181 |

*Primary Examiner*—John J. Zimmerman
*Attorney, Agent, or Firm*—Oblon, Spivak, McClelland, Maier & Neustadt

[57] ABSTRACT

A heat resistant structure of a honeycomb type which is used for a catalytic reactor for purification of exhaust gases in the internal combustion engine of a motor vehicle. A catalytic carrier matrix is prepared by joining a corrugated sheet and flat sheet which are alternately placed in layers in a wound from. A pair of pieces of brazing materials made of amorphous alloy are interposed along the longitudinal direction of the matrix at predetermined intervals in the width direction of the matrix. A pair of pieces of said brazing material interposed at both end portions of the matrix face each other across the flat sheet and are deviatedly placed from each other in the width direction of the matrix.

5 Claims, 4 Drawing Sheets

HEAT RESISTANT STRUCTURE

BACKGROUND GROUND OF THE INVENTION

1. Field of the Invention

The present invention relates to a heat resistant structure which is used in a high temperature environment, particularly to a heat resistant structure of a honeycomb type in which a corrugated steel sheet and a flat steel sheet for a matrix to carry catalyst material are alternately joined by the use of a brazing material. The structure is used, for example, in a catalytic converter to purify exhaust gases from an automobile engine, whereby the catalyst is deposited or carried on the matrix of the structure.

2. Prior Art

As a heat resistant structure of a honeycomb type, it is known hitherto that a corrugated steel sheet and a flat steel sheet, each having the same thickness for a carrier matrix, are alternately laminated to each other, and joined with brazing material into a wound shape or vertically laminated into a multilayer block shape.

In such a conventional heat resistant structure, the brazing material is applied to the whole surface of contact between the corrugated and flat sheets which are alternately laminated to each other. In other words, the entire surface of the mutually contacted portions of brazing. Since the corrugated and flat sheets have different thermal expansion coefficients, it is difficult for the structure to absorb thermal expansion without straining or cracking, when the structure is used in a high temperature environment, and these structures consequently have poor durability.

Therefore, a technical method has been developed whereby corrugated and flat sheets of the same thickness are partially joined. For example, a heat resistant structure in which the corrugated and flat sheets are alternately laminated to each other are partially joined whereby brazing material is used for the joining. Since the corrugated and the flat sheets are partially joined, it is relatively easy to absorb thermal expansion, and the occurrence of strain or cracks is avoided.

In such a heat resistant structure, a plurality of pieces of brazing material of elongated belt shape are generally used, to simplify the interposing work or setting work, whereby a plurality of long pieces of brazing material are interposed at predetermined intervals of the width direction of the matrix along the longitudinal direction between the corrugated and flat sheets. FIG. 1 is an enlarged cross sectional view showing the main section of such a conventional heat resistant structure as the prior art. As shown in the drawing, brazing material A having the same width is hitherto used and are interposed at least at both edge portions of a matrix. There, a pair of brazing pieces A which face each other across the flat sheet 1 of the matrix are matched with respect to their counterpart in the width direction of the matrix.

PROBLEM TO BE SOLVED

In a hitherto known heat resistant structure, strain or cracks may easily occur in the matrix, particularly, in a flat sheet of the matrix.

Since two of brazing pieces A, for example, shown in FIG. 1 which face each other across the flat sheet of the matrix are matched with respect to the location in the width direction of the matrix, stress concentrates adjacent to the joint edges of the brazing material A in the matrix, particularly in the flat sheet 1. Further, the matrix, particularly the flat sheet 1, may easily cause more thermal strain than the corrugated sheet when both sheets have the same thickness, so that if the flat sheet 1 is used in a high temperature environment, it may easily oxidize, and straining or cracking, may easily occur in the portion 4 near the ends of the brazing pieces, and a problems concerning durability may be raised.

As a countermeasure for this problem, a method of using a thicker flat sheet has been proposed. However, such a heat resistant structure increases the weight due to the use of the thicker sheet and the surface area of the cell wall onto which the catalyst is carried decreases. Therefore, the method is not preferable.

SOLUTION OF THE PROBLEM

The invention is made to solve the above problem. It is an object of the invention to propose a heat resistant structure in which brazing pieces which are interposed at both edge portions of the flat sheets of a matrix material so as to sandwich the matrix material inbetween are arranged to slightly deviate from each other so that stress concentration on the flat sheet can be avoided.

SUMMARY OF INVENTION

It is an object of the present invention to provide for a heat resistant honeycomb structure which is used for a catalytic reactor for purification of exhaust gases in an internal combustion engine of a motor vehicle whereby a catalytic carrier matrix is prepared by joining a corrugated steel sheet and a flat steel sheet which are alternately placed in layers in a wound form.

In accordance with the present invention, this object is essentially obtained as follows.

The carrier matrix consists of flat and corrugated steel sheets which are joined with a plurality of belt-shaped pieces of brazing material interposed between both sheets and heated together. The pair of brazing pieces interposed between the corrugated and flat sheets and placed at both ends of the sheets in the width direction face each other across the flat sheet and not matched but shifted from each other. Another object of the invention is to provide a heat resistant structure comprising both outer ends of two pieces of the brazing material disposed at both end portions of the matrix in the width direction which are aligned with the ends of the matrix, and each width of the two pieces of brazing material which face each other across a flat sheet being different, and accordingly, each inner end of the two brazing pieces across the flat sheet being deviated from each other. A further object of the invention is to provide a heat resistant structure whereby two brazing pieces disposed at both end portions of the matrix have the same width and the outer end of one brazing piece is aligned with the end of the matrix while the position of the outer end of the opposite brazing piece across the flat sheet is deviated from the end of the matrix.

A still further object of the invention is to provide a heat resistant structure wherein two of the brazing pieces disposed at both end portions of the matrix have each different widths, and the outer end of one brazing piece is aligned with the end of the matrix while the position of the outer end of the opposite brazing piece across the flat sheet is deviated from the matrix.

It is also an object of the invention is to provide a heat resistant structure wherein the position of both ends of two brazing pieces which are placed opposite each other across the flat sheet are deviated from the end or ends of the matrix at least with respect to one end of the matrix.

According to the invention, it is advantageous that, since the stress concentration in the matrix, and particularly in the flat sheet is reduced, strain or cracks hardly occur and the durability is improved Moreover, an increase in the weight of the matrix and particularly of the flat sheet is avoided without reducing the surface area of the cell wall onto which the catalyst is deposited.

BRIEF DESCRIPTION OF THE DRAWING

The invention will be described in detail referring to the embodiments shown in the drawings, wherein.

DETAILED DESCRIPTION OF THE EMBODIMENTS

Figure 1:
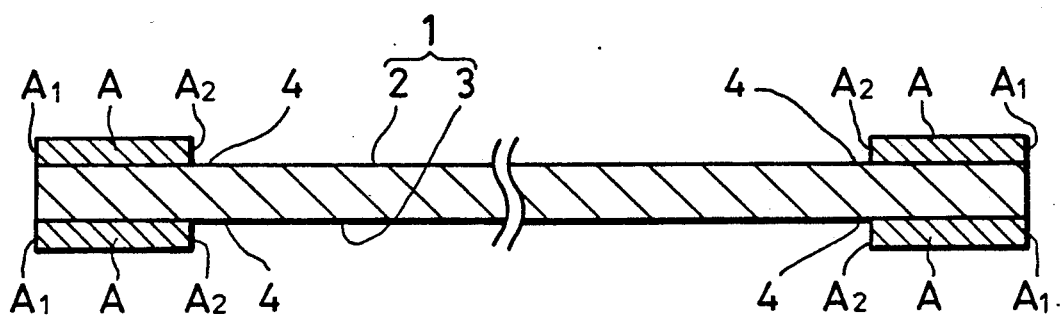
FIG. 1 shows a sectional view of a part of the matrix of a heat resistant structure according to the prior art.
Figure 2:
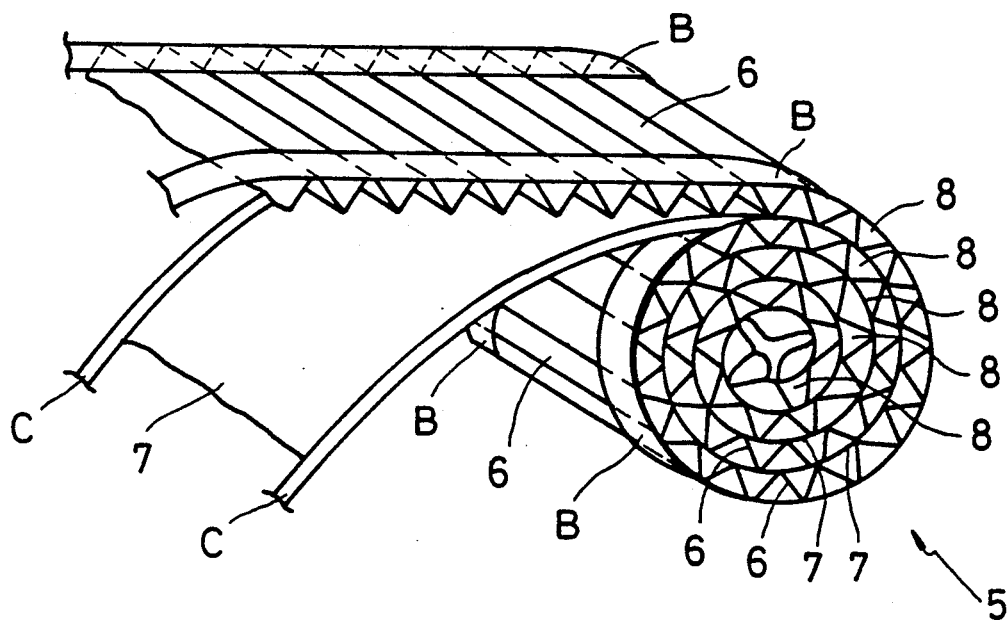
FIG. 2 is a perspective view of an embodiment in the state of forming a heat resistant structure according to the invention.

In the embodiment illustrated in FIG. 1 and FIG. 2, a heat resistant structure 5 has a honeycomb structure for a catalytic converter designed for cleaning the exhaust gases in an internal combustion engine of a motor vehicle. High temperature resistant steel sheets 6 and 7 as well as brazing pieces B and C are formed in a wound shape, a circular shape or an elliptic shape.

Figure 3:
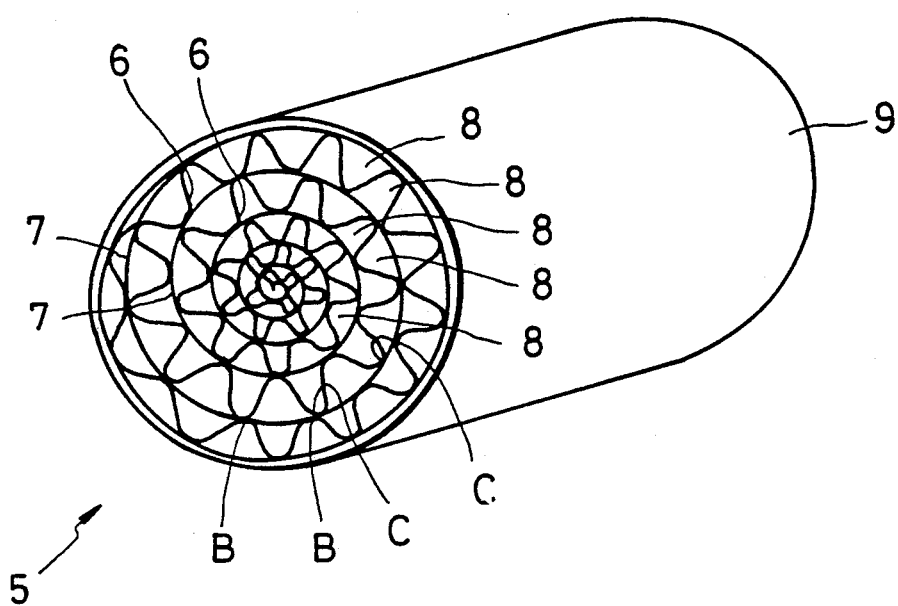
FIG. 3 is a perspective view of a formed heat resistant structure.

In the embodiment shown in FIG. 2 or FIG. 3 only one corrugated steel sheet 6 and one flat steel sheet 7 are used. However, a plurality of sets of a corrugated steel sheet 6 and a flat steel sheet 7 may be alternately placed in layers and wound. On the other hand, although the heat resistant structure 5 has a wound rolled shape in the embodiment in FIG. 2 or FIG. 3, it is not limited to such a wound shape but can be a laminated flat block shape. In other words, a plurality of corrugated steel sheet 6 and flat steel sheet 7 which are alternately overlaid and have a predetermined length are used as a matrix. Those sheets joined in a multilayer structure by brazing pieces B and C to form a flat laminated block can be used.

The heat resistant structure 5 has a honeycomb structure whereby a corrugated sheet 6 and a flat sheet 7 of a matrix form a cell wall. The structure comprises an assembly of a number of cells 8 of various shapes such as triangles semihexagons trapezoids and the like. The heat resistant structure 5 has such characteristics such as light weight, high rigidity and strength. It is also excellent in rectifying fluid. Further it is easy and economic to manufacture. In addition, because the surface area per unit volume is large, total surface area of the plate corrugated sheet 6 and flat sheet 7 seving as a cell wall is large. Therefore, the heat resistant structure 5 can be conveniently used, for instance, in a catalytic converter to clean exhaust gases from an automobile engine whereby the catalyst for reduction is deposited onto the surfaces of the corrugated sheet 6 and flat sheet 7 for a cell wall for a catalyst carrier.

Elongated belt-shaped brazing pieces of solid state B and C are used for joining the sheets. A plurality of brazing pieces are interposed between the corrugate sheet and flat sheet at predetermined intervals in the width direction of the sheets along the longitudinal direction. The brazing pieces B and C are interposed at least along both edge portions of the corrugated sheet 6 and flat sheet 7 of a matrix. Further, more brazing material can be interposed between the sheets when, for example, the width of the matrix is considerably wide and the joint strength is insufficient. Thus the brazing pieces B and C are partially interposed into the contact portions between the corrugated sheet 6 and flat sheet 7 which are alternately overlaid, thereby partially joining the corrugated sheet and flat sheet by heating the matrix together with the interposed brazing pieces.

For the brazing pieces B and C, a nickel radical brazing material, an amorphous material or the like is used. In patricular, amorphous material is suitable as a material for the heat resistant structure 5 in which the matrix is partially joined as mentioned above because it has great joint strength. It is strong because the amorphous material is fused at a predetermined melting temperature and is uniformly distributed without irregularites along the matrix due to conversion to an alloy. In FIG. 3, reference numeral 9 denotes a casing. The casing 9 has a cylindrical shape with a circular or elliptical cross section. The heat resistant structure 5 is enclosed in the casing 9.

As the brazing pieces B or C, a non-crystalline amorphous alloy is used. For manufacturing the amorphous alloy, a small amount of additives of Fe, Si, B, Cr, Mo or W are added to a Ni-based or Co-based alloy, and the alloy is heated under high temperature to a liquid state and then quickly cooled to an amorphous state. Brazing material which is an amorphous alloy fuses under a certain high temperature and therefore does not cause irregularities and uniformly diffuses between the flat sheet 7 and corrugated sheet 6 to form a solid state alloy when cooled. The strength and bonding strength are excellent. One example of this brazing material is known by the trade name "Metaglas" MBF. 15 or 17, 20, 30, 35, 50, 60, 65, 75, 80, 90 and has been distributed by Allied Corporation in the U.S. since 1978. It is a Ni-based alloy with the following physical characteristics:

| Temp. °C. | Thermal expansion coefficient × 10⁻⁶/°C. | Specific heat Cal/g · °C. | Heat proof temp. °C. |
| --- | --- | --- | --- |
| 25 | 11 | 0.1 | 1500 |
| 100 | 12 | — | (foil fusing |
| 300 | 12 | — | temp.) |
| 600 | 13 | 0.14 | |
| 900 | 14 | 0.15 | |
| 1200 | 15 | 0.16 | |

Hereinafter, each embodiment of the matrix according to the present invention will be described.

Figure 4:
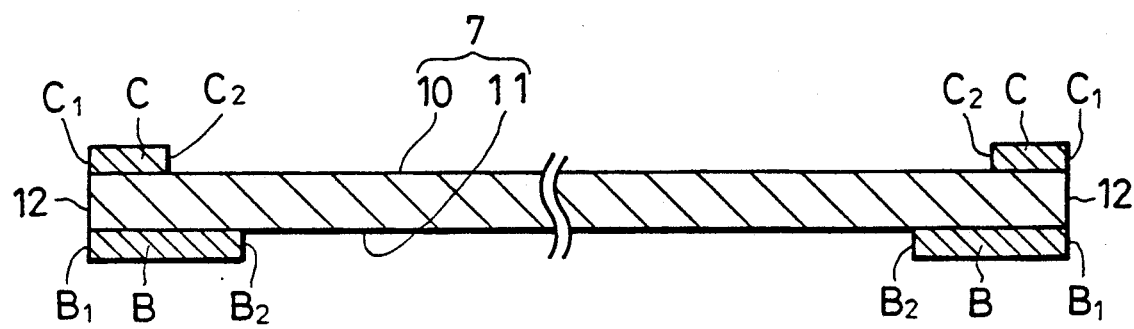
FIG. 4 is a sectional view of the first embodiment according to the present invention.
Figure 5:
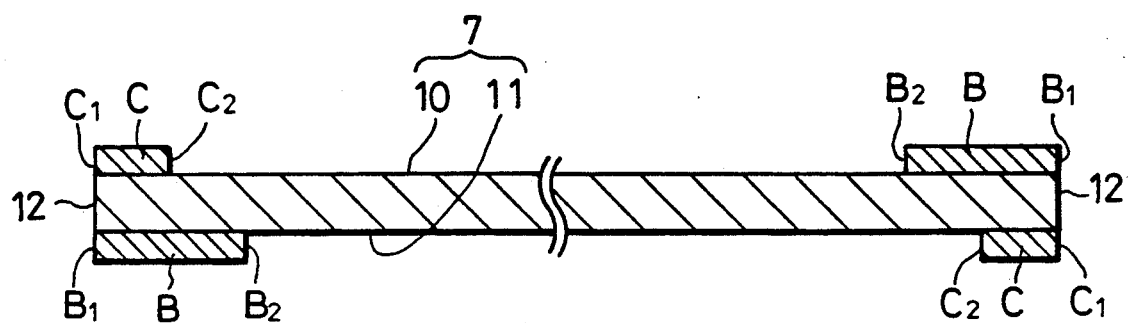
FIG. 5 shows a sectional view of the second embodiment.
Figure 6:
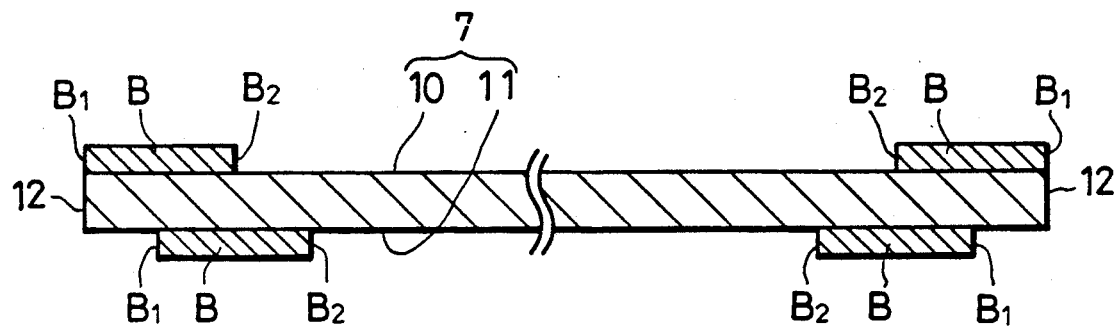
FIG. 6 shows a sectional view of the third embodiment.
Figure 7:
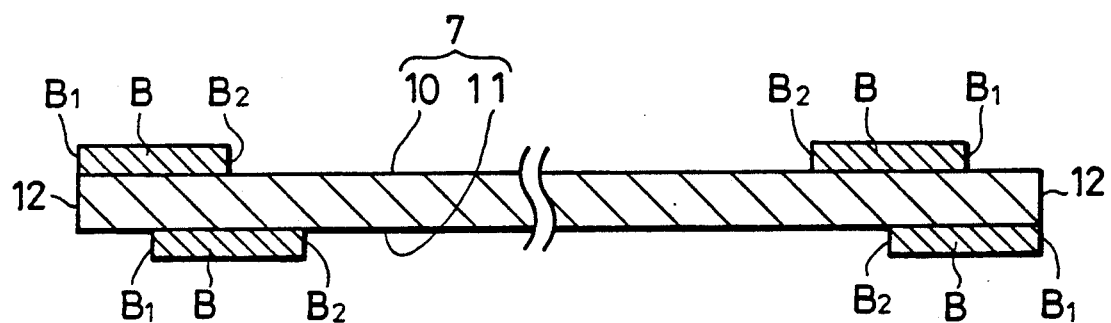
FIG. 7 shows a sectional view of the fourth embodiment.
Figure 8:
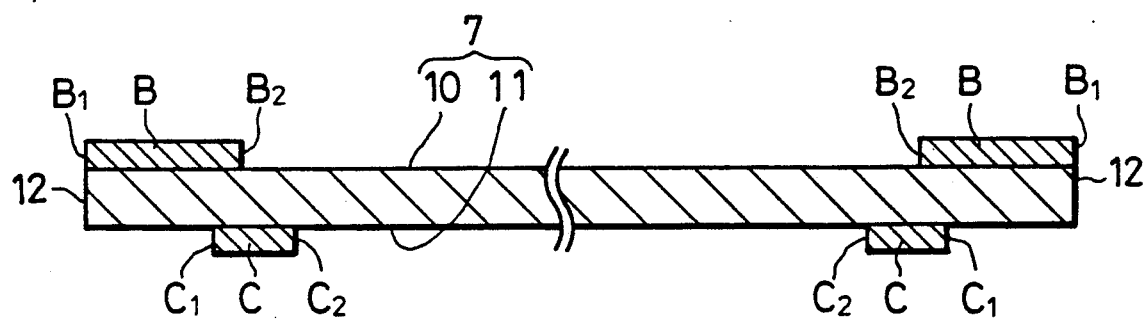
FIG. 8 shows a sectional view of the fifth embodiment
Figure 9:
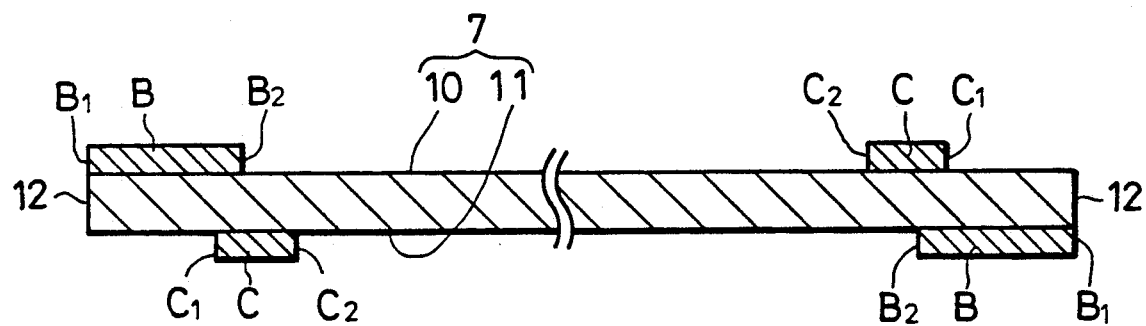
FIG. 9 shows a sectional view of the sixth embodiment.

Each figure from FIG. 4 through FIG. 9 shows an enlarged cross sectional view of the embodiments according to the invention. FIG. 4 shows the first embodiment, FIG. 5 shows the second embodiment, FIG. 6 shows the third embodiment, FIG. 7 shows the fourth embodiment, FIG. 8 shows the fifth embodiment, and FIG. 9 shows the sixth embodiment.

In the first embodiment in FIG. 4, and the second embodiment pieces in FIG. 5, outer ends $B_1$ and $C_1$ of the brazing materials B and C interposed respectively in both edge portions of the flat sheet 7 of the matrix are aligned with outer ends 12 of the matrix. The width of the pieces of brazing material which face each other so as to sandwich the matrix inbetween differs from that of each other and the inner ends $B_2$ and $C_2$ are deviatedly placed from each other in the width direction of the matrix.

In other words, in the first embodiment of FIG. 4, the narrow brazing piece C is arranged at the side or upper side in the drawing of the surface 10 of the flat sheet 7 of the matrix and the wider brazing piece B is arranged on the other surface 11. The width of pieces B is different from that of C, and consequently the width of brazing pieces B or C is the same on the same side of the flat sheet. The outer ends $B_1$ and $C_1$ of the brazing materials B and C are aligned with the end 12 of the flat sheet 7.

In the second embodiment of FIG. 5, the wide piece B and the narrow brazing piece C are disposed at one side of the surface 10 of the flat sheet. Hereby, brazing pieces B and C having different widths are used. The brazing pieces B and C of different widths are placed at the same side of the flat sheet and the width of one of the brazing pieces which faces the other across the flat sheet is also different from that of the other. Moreover, the outer ends $B_1$ and $C_1$ of the brazing pieces are aligned with the end 12 of the flat sheet 7, so that the inner ends $B_2$ and $C_2$ of the brazing pieces which face each other and sandwich the flat sheet in between are deviatedly placed with respect to each other on the opposite sides of the flat sheet.

The third and fourth embodiments according to the invention will be explained below.

In the third embodiment in FIG. 6 and the fourth embodiment in FIG. 7, all of the widths of the brazing pieces B interposed in both edge portions of the flat sheet 7 of the matrix are the same. The outer end $B_1$ of one of the brazing pieces is aligned with the end 12 of the matrix, while the outer end $B_1$ of the other brazing pieces is deviatedly placed from the end 12 of the matrix.

In other words, in the third embodiment in FIG. 6, in contrast with the first and second embodiments the brazing pieces B which have the same wide width are used. It is also possible to use brazing pieces of the same narrow width. The outer end $B_1$ of the brazing material B on the side 10 of the flat sheet 7 is aligned with the end 12, while the outer end $B_1$ of the brazing piece B on the side 11 of the flat sheet 7 is deviated inward from the edge 12.

In the fourth embodiment in FIG. 7, the brazing pieces B which have the same and wide width are used. The outer end $B_1$ of the brazing piece B at the upper left side of the drawing on the side 10 of the flat sheet 7 is aligned with the edge 12 of the flat sheet 7. The outer end $B_1$ of the brazing piece B at the right side is deviatedly placed inward from the end 12 of the flat sheet 7. However, the outer end $B_1$ of brazing piece B at the upper left side of the drawing on the side of 11 of the flat sheet 7 is deviatedly placed inward from the end 12. The outer end $B_1$ of the brazing piece B at the right side is aligned with the end 12.

In the fifth embodiment in FIG. 8 and the sixth embodiment in FIG. 9, the width of each of the brazing pieces which face each other so as to sandwich the flat sheet 7 inbetween is different. The outer end $B_1$ of one of the brazing pieces is aligned with the end 12 of the matrix. The outer edge $C_1$ of the other brazing piece is deviatedly placed inward from the end 12 of the matrix.

In other words, in the fifth embodiment in FIG. 8, the wide brazing piece B is arranged on the side 10 of the flat sheet 7 and the narrow brazing piece C is arranged on the side 11. That is, the brazing pieces B and C with different widths are used The brazing pieces B and C of the same width are arranged on the same side of the flat sheet. The outer end $B_1$ of the brazing piece B on the side 10 flat sheet 7 is aligned with the end 12. The outer edge $C_1$ of the brazing piece C in both edge portions on the side 11 of the flat sheet 7 is deviatedly placed inward from the edge 12.

In the sixth embodiment in FIG. 9, the wide brazing piece B and the narrow brazing material C are arranged on the side 10 of the flat sheet 7. The brazing pieces B and C of different widths are arranged on the same side of the flat sheet. On both sides 10 and 11, the outer ends $B_1$ and $B_1$ of the two wide brazing pieces B are aligned with both outer ends 12 and 12 of the flat sheet 7. Both outer ends $C_1$ and $C_1$ of the narrow brazing piece C are deviatedly placed inward from both ends 12 and 12.

A resistant structure 5 according to the invention is not limited to the foregoing embodiments. Various combinations of brazing material B and C with respect to width and disposition on the flat sheet are possible. Any construction wherein the construction of the foregoing embodiments are partially combined can be used. Also constructions different from all of the foregoing embodiments are also used.

For instance, it is possible for all of the outer ends $B_1$ and $C_1$ of the brazing pieces B and C to be deviatedly placed inward from at least one edge 12 of the matrix.

In contrast with each of the foregoing embodiments, the brazing pieces B and C can be interposed into not only both edge portions of the corrugated sheet 6 and flat sheet 7 of the matrix but also into an intermediate portion or portions between both edge portions in order to improve the joint strength. Such intermediate brazing pieces can be also interposed whereby a pair of pieces may face each other across the flat sheet in a deviated position with respect to their relative arrangement.

What is claimed is:

1. A heat resistant structure for a catalytic reactor designed for cleaning exhaust gases in an internal combustion engine of a motor vehicle, the heat resistant structure comprising high temperature resistant steel sheets coated with a catalyst material, said steel sheets including a first flat sheet and a second corrugated sheet alternately disposed in layers, said individual layers of the steel sheets being brazed together with brazing material interposed between said sheets to form a honeycomb shaped carrier matrix of the catalyst material, whereby a plurality of pieces of said brazing materials of amorphous alloy are interposed along the longitudinal direction of the steel sheets with predetermined intervals thereamong in the width direction of the matrix, a pair of pieces of said brazing materials interposed at the both end portions of the matrix facing each other across the flat sheet inbetween being placed in deviation from each other in the width direction of the matrix.

2. A heat resistant structure according to claim 1 comprising both outer ends of two pieces of the brazing material diposed at both end portions of the matrix in the width direction and face each other across a flat sheet inbetween are aligned with the ends of the matrix, and each width of said two pieces of brazing material which face each other across the flat sheet being different, and accordingly, each inner end of said two pieces of brazing material being positioned in deviation from each other.

3. A heat resistant structure according to claim 1 comprising two pieces of the brazing material disposed at both end portions of the matrix and face each other across a flat sheet inbetween having the same width and the outer end of one piece of brazing material being aligned with the end of the matrix while the outer end of the oposite piece of brazing material across the flat sheet being deviatedly placed from the end of the matrix.

4. A heat resistant structure according to claim 1 comprising two pieces of the brazing material disposed at both end portions of the matrix, each having different width, and the outer end of one piece of brazing material being aligned with the end of the matrix while the outer end of the opposite piece of brazing material across the flat sheet being deviatedly placed from the matrix.

5. A heat resistant structure according to claim 1 comprising one of both outer ends of two pieces of brazing material which are placed opposite each other across the flat sheet being deviatedly placed from at least one end of the matrix.

* * * * *